Sept. 17, 1940.                G. PRINCE                2,215,251
                    END PROTECTOR FOR THREADLESS PIPE
                           Filed Feb. 7, 1938

Patented Sept. 17, 1940

2,215,251

UNITED STATES PATENT OFFICE 2,215,251

END PROTECTOR FOR THREADLESS PIPE

Gary Prince, Bloomington, Tex., assignor of one-fourth to R. C. Hall

Application February 7, 1938, Serial No. 189,079

4 Claims. (Cl. 138—96)

This invention relates to an end protector for threadless pipe.

An object of the invention is to provide a device of the character described which may be readily applied to and removed from the ends of threadless pipe to protect said ends while the pipe is being handled.

It is common practice in assembling threadless pipe into lines and particularly when said pipe is used in wells for casing up the well, to weld the ends of adjacent sections together. In performing the welding process it is important that the ends of the pipe be perfectly round and not dented or distorted, as otherwise an imperfect weld will be produced allowing fluid flowing, under pressure, through the casing or pipe line to escape. In handling threadless pipe, particularly while hauling it to the field or other location where it is to be welded the ends of the pipe, unless protected, will often become dented or distorted so that it will be unfit for use and must be returned to the shop for reconditioning.

It is a prime object of the present invention to provide an end protector that may be readily applied to the ends of the pipe, that will securely grip said ends so as not to become displaced and that may be readily removed from the pipe.

It is a further object of the invention to provide an end protector that will have sufficient strength to withstand rough usage and which will, at the same time, have sufficient resiliency to offer the desired protection to the ends of the pipe to which it is applied.

With the above and other objects in view the invention has particular relation to certain novel features of construction, arrangement of parts and use, examples of which are given in this specification and illustrated in the accompanying drawing, wherein.

Figures 1, 2:
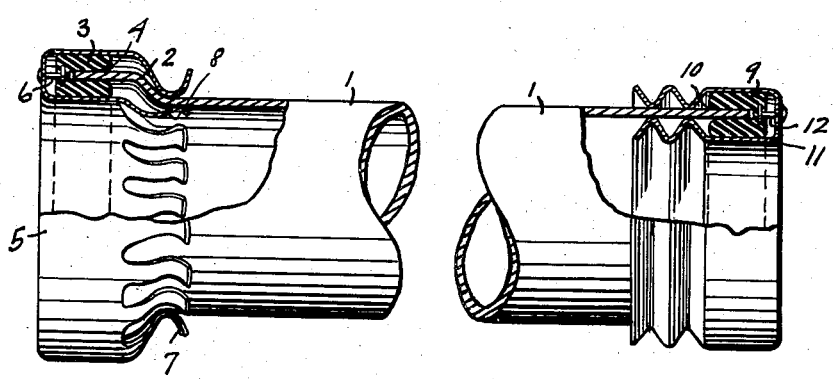
Figure 1 shows a side view, partly in section, of the bell end of a section of pipe showing one form of the protector applied thereto.
Figure 2 shows a side elevation, partly in section, of the plain end of the pipe section showing a form of protector, adapted to said plain end, as applied thereto.

Referring now more particularly to the drawing wherein like numerals of reference designate similar parts in each of the figures, the numeral 1 designates a pipe section one end of which is flared, or formed with the bell 2 to receive the plain end of the adjacent section to be welded thereto. Fitted onto the free end of the bell 2 there is the protector body 3 which is formed of rubber or similar resilient material and which is of annular shape. The inner end of the body has a deep, annular groove 4 to receive the free end of the pipe which fits closely therein. Fitted closely over said resilient body 3 there is an annular shell 5 preferably formed of steel. This shell is approximately U-shaped in cross-sectional contour and closely embraces the annular body 3 and is fastened thereto by means of a suitable fastener 6. The free margins of the shell are serrated forming the outer and inner clamp fingers 7 and 8. These fingers converge inwardly, toward each other so as to securely grip the section 1 of the pipe adjacent the bell end 2 thereof, as clearly illustrated in Figure 1 but the ends of the fingers are outwardly curved, that is, they diverge from each other so that they may be readily started over the end of the pipe in applying the protector. When forced into place over the bell-shaped end of the pipe the protector will thus be securely held while hauling and handling the pipe.

The form of protector shown in Figure 2 for the other end of the pipe section 1 embodies a body 9 formed of rubber or other resilient material and substantially similar in shape to the shape of the body 3 having the deep, annular groove 10 to receive the corresponding end of the pipe. Fitted over the body 9 is the shell 11 to which the body 9 is secured by a suitable fastener 12. This shell is substantially U-shaped in form but its inner margins are annularly corrugated, as shown in Figure 2, the corrugations gripping the pipe and securely holding the protector in place. The extreme margins of the shell 11 diverge outwardly so that the protector may be readily forced onto the end of the pipe to be protected.

Figures 3, 4:
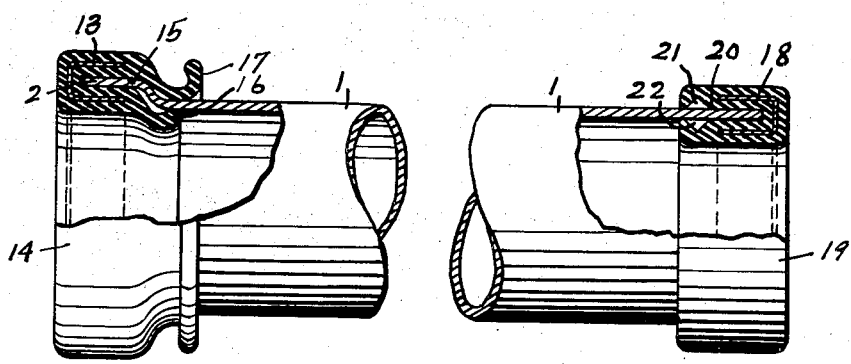
Figure 3 shows a side view, partly in section, of the bell-shaped end of the pipe section showing another embodiment of the protector applicable thereto.
Figure 4 shows a side view, partly in section, of a section of pipe showing the plain end of the section and showing another embodiment of the form of protector applicable thereto.

In the form shown in Figure 3 there is a metal ring 13 of a substantially U-shape in cross-section. This ring is imbedded in the main body portion 14 of the protector forming a re-enforcement therefor. The main body of the protector in this form is composed of rubber or other resilient material and has a deep, annular groove 15 to receive the bell-shaped end of the pipe. The free margins 16, 17 of the body 14 are formed to substantially follow the contour of the bell and to grip the pipe between them, the margin 17 having its extreme outer edge curved outwardly to facilitate fitting the protector onto said end of the pipe.

The protector shown in Figure 4 embodies the metal ring 18 which is U-shaped in cross-sectional contour and which is similar to the ring 13. In this instance the body 19 of the protector is formed of rubber or similar resilient material and the ring 18 is imbedded therein as shown. The body 19 has a deep, annular groove 20 to receive the straight end of the pipe and the free margins of the body 19 have the annular, coinciding outside and inside grooves 21, 22 thus forming the extreme free portions of the body into outside and inside annular grips which securely grip the pipe to maintain the protector in place.

The metal parts of the protectors hereinabove referred to are preferably made of steel to give them the required strength as well as resiliency.

The drawing and description disclose what are now considered to be preferred forms of the invention by way of illustration only, while the broad principle of the invention will be defined by the appended claims.

What I claim is:

1. An end protector for pipe comprising an annular, resilient body having a groove shaped to receive the pipe end, an annular metal shield shaped to embrace said body and formed with gripping means to grip the pipe.

2. An end protector for pipe comprising an annular, resilient body having a groove shaped to receive the pipe end, an annular metal shield embracing the resilient body and formed with clamps shaped to grip the pipe to maintain the protector in place.

3. An end protector for pipe embodying an annular resilient body and a metal ring assembled with the body, said assembly having an annular groove to receive the pipe and whereby the protector will surround the outside and inside of the pipe end, said protector also embodying means for gripping the pipe to maintain the protector assembled therewith.

4. An end protector for pipe comprising an annular body formed of resilient material, a metal ring imbedded in the material of said body and approximately U-shaped in cross-section, said assembly having a deep, annular groove to receive the pipe end and surrounding the outside and inside of said pipe end and gripping means on the body for gripping the pipe to maintain the protector firmly on the end of the pipe.

GARY PRINCE.